March 10, 1925. 1,529,342
S. CHRISTY
AUTOMATIC ELECTRIC TOASTER
Filed May 14, 1923 2 Sheets-Sheet 1
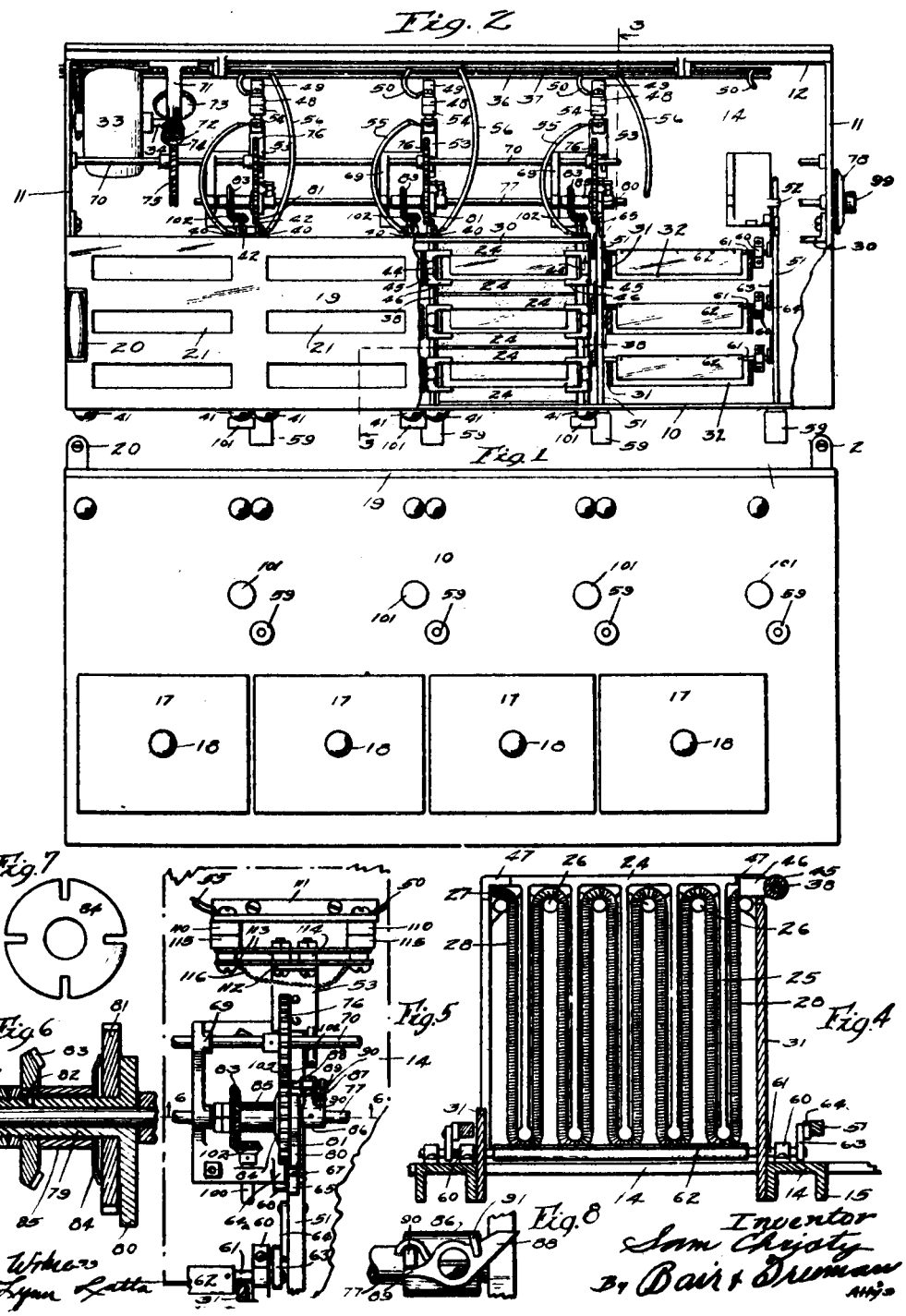

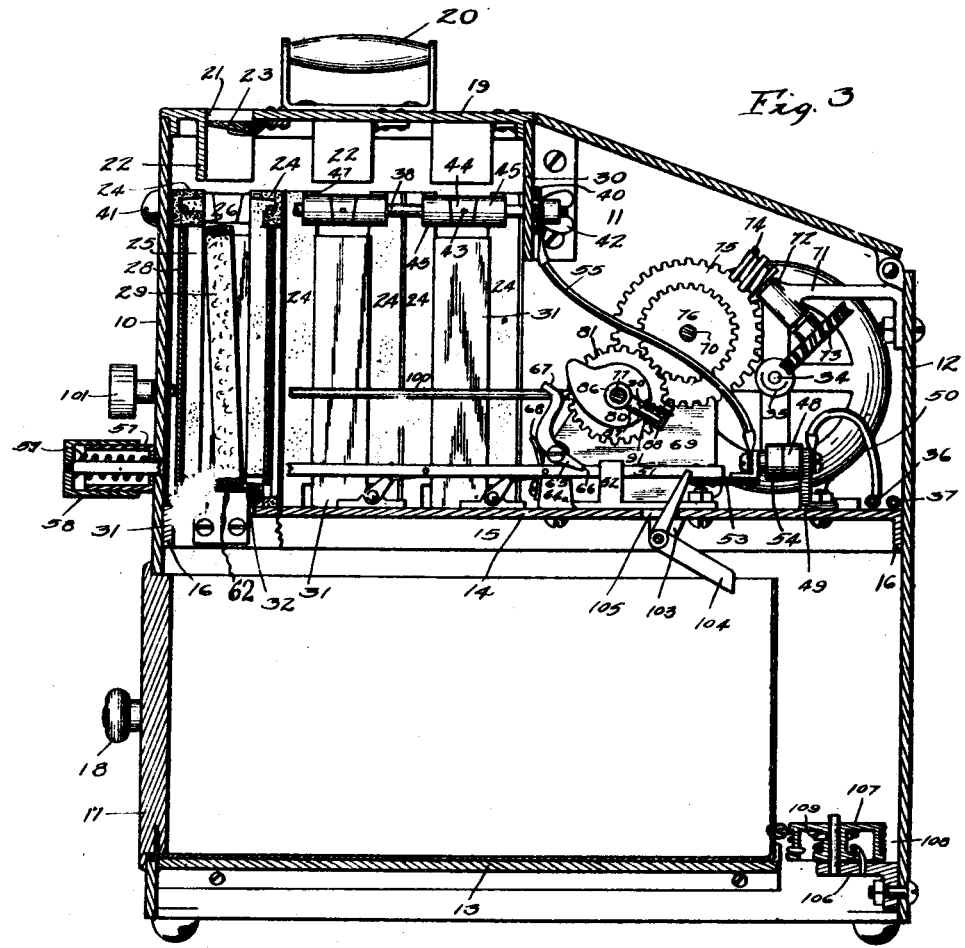
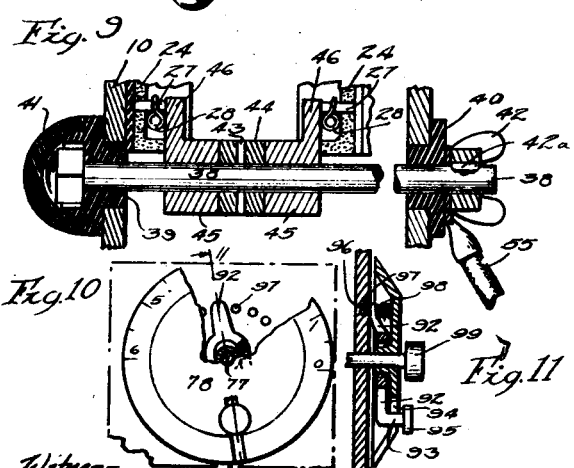
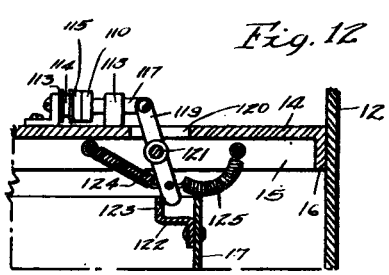

Patented Mar. 10, 1925.

1,529,342

UNITED STATES PATENT OFFICE.

SAM CHRISTY, OF DES MOINES, IOWA.

AUTOMATIC ELECTRIC TOASTER.

Application filed May 14, 1923. Serial No. 638,820.

*To all whom it may concern:*

Be it known that I, SAM CHRISTY, a citizen of the United States, and a resident of Des Moines, in the county of Polk and State of Iowa, have invented a certain new and useful Automatic Electric Toaster, of which the following is a specification.

The object of my invention is to provide an automatic electric toaster for bread and the like.

My invention involves a structure in which there is provided a casing having a compartment for toasting bread and the like and preferably having below that compartment another compartment in which drawers may be provided. The toasting compartment is provided with heating means, such as resistance units and the lower compartment is so located with relation to the upper compartment that it receives some heat and is adapted to keep the bread warm when the bread is dropped therein.

A further object is to provide in such a device means for automatically dropping the bread into the lower compartment after a predetermined time.

Still a further object is to provide means whereby the current is automatically shut off at a predetermined time or is automatically shut off by opening the drawers.

A further object is to provide in such a machine a novel heating unit.

Another purpose of my invention is to provide novel mechanism, whereby the bread may be dropped after various predetermined lengths of time.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a front elevation of the toaster embodying my invention.

Figure 2 shows a top or plan view of the same, parts being omitted, parts broken away and parts being shown in section.

Figure 3 is a detailed, sectional view taken on the line 3—3 of Figure 2.

Figure 4 shows an elevation of one of the heating units, part of the supporting frame being shown in section.

Figure 5 shows an enlarged, plan view of part of the operating mechanism.

Figure 6 shows a detail, sectional view taken on the line 6—6 of Figure 5.

Figure 7 shows an elevation of a friction gripping or clutch element.

Figure 8 shows a detail view, parts being broken away, of a pawl mechanism forming part of the device, looking from the rear of the device.

Figure 9 is a detailed, sectional view enlarged, illustrating the arrangement of one of the bus bars.

Figure 10 is an elevation of the controlling dial, parts being broken away and parts being shown in section.

Figure 11 is a detail, sectional view taken on the line 11—11 of Figure 10; and

Figure 12 is a detail, sectional view illustrating a modification of my invention.

In the drawings herewith, I have shown the toaster having the casing composed of the front wall indicated generally by the reference character 10, and having the side walls 11, the rear wall 12, the lower floor or deck 13 and the intermediate floor or deck 14.

The floors or decks 13 and 14 may be cast from metal and formed with downwardly projecting reinforcing ribs 15 and with flanges 16 bolted or otherwise secured to the side, front and back walls.

It will be seen that the upper deck or floor 14 divides the casing into an upper or toasting compartment and a lower compartment for receiving the toasted bread and the drawers for holding it.

Slidably extended into the lower compartment through the front wall 10 is a series of drawers 17 each having a knob or the like 18. Above each drawer is what I may call a toasting unit including three pairs of spaced heating elements and suitable guide and supporting means for a series of slices of bread. As shown herein, each unit is designed to handle three slices of bread.

The upper part of the upper compartment has a removable cover 19 with handles 20. The cover is provided with a series of openings 21. Extending downwardly from the openings 21 inside the upper compartment are guide plates or the like 22. The slices of bread are inserted through the openings 21 into the upper compartment. Each opening 21 is normally closed by a spring actuated closure device 23.

In the drawings, I have shown four toaster units one above each drawer 17. These toaster units are similar in construction and I will therefore describe only one of them in detail.

Each toaster unit has at its opposite sides heating elements. Each element consists of the substantially rectangular frame 24. Each frame 24 has a plurality of vertical ribs 25 extending from the top member of the frame to points spaced above the bottom thereof and spaced horizontally from each other as illustrated for instance in Figure 4.

Equi-distantly spaced from the ribs 25 at the top of the frame are supporting lugs or hook members 26 for the resistance unit hereinafter mentioned.

The frame 24 is preferably of a molded insulating compound and is of high electrical and temperature resistance.

At each upper corner of the frame 24 is mounted a pin or the like 27 to which is secured one end of a link of nichrome wire 28 or other suitable resistance unit. The wire 28 is secured to one of the pins 27 and then extended downwardly and around the lower end of the next adjacent rib 25 thence upwardly and over the next hook or supporting member 26 and so on, and the opposite end of the wire 28 is secured to the other pin 27.

One element is placed against the front wall 10 of the upper or toasting compartment of the casing. Two elements are then placed back to back adjacent to each other and spaced from the front element a sufficient distance to leave room for a slice of bread 29 between the two forward heating units.

Spaced a similar distance rearwardly is another pair of units and spaced a similar distance from that pair is another heating element, as shown in Figure 3.

Extending downwardly from the top of the upper compartment is a short cross frame member or partition 30 which helps to keep the heat away from the machinery and also helps to support the rear heating element 24 and the bus rods hereafter mentioned.

It will be seen that a space is provided between the first two heating elements for a a slice of bread 29. A similar space is provided between the third and fourth heating elements and a similar space between the fifth and sixth heating elements.

Each toasting unit therefore in the form of the toaster shown herein has provision for three slices of bread.

It will, of course, be understood that this arrangement could readily be varied.

At the ends of each space, I provide end members 31 shown in Figures 2, 3 and 4, which serve to limit the movement of the slices of bread sideways in the toaster.

The ribs 25 protect the slices of bread from contact with the resistance elements.

At the bottom of each such space, the deck or floor 14 is provided with an opening 32 to permit the bread to drop through into the lower or storage compartment and into the appropriate drawer 17.

Later herein, I will describe the supporting element which is arranged at each of such openings 32.

In the rear part of the upper or toasting compartment is a space or compartment for certain operating mechanism. In such last-named space is mounted an electric motor 33 having the shaft 34 on which is a gear element 35.

I will now describe the electrical connections for the heating element.

Received in the back of the upper or toasting compartment are the conducting wires 36 and 37, which may be connected with any source of electrical energy.

Adjacent to the upper parts of the heating elements at the opposite ends thereof are bus bars 38 extended through the wall 10 and the supporting frame member 30, as shown in Figure 3 and Figure 9 and insulated from said walls by bushings 39 and 40.

The head of each bus bar 38 projecting from the wall 10 is covered by an insulator cap 41 screwed on the bushing 39 as shown in Figure 9.

Keyed to an end of each bus bar 38 is a wing nut or the like 42. Fixed to each bus bar 38 by means of pins 43 are collars 44 with helical cam faces as shown in Figure 3.

One collar 44 is located substantially midway between the first and second frames 24, another substantially midway between the third and fourth frames 24, and another substantially midway between the fifth and sixth frames 24.

On each side of each collar 44 is a bushing or collar 45 having a contact finger 46 projecting into a notch 47 at the upper corner of the adjacent frame 24, as illustrated in Figures 4 and 9, and arranged to contact with a pin 27 already described.

In each toasting unit, there is provided a switch. I have shown in the drawings two forms for this switch.

In Figures 2 and 3, I have shown a switch comprising the contact 48 mounted on the insulating bracket 49. The contact 48 is connected by a wire 50 with one of the wires 36 or 37.

A push rod 51, angular in cross section and extending fore-and-aft in the device, is slidably mounted in a bracket 52 and in the front wall 10 as illustrated in Figure 3 and projects forwardly from the wall 10, as shown.

Secured to the rear end of the push rod 51 is a bar of insulating material 53, which supports the contact 54. The contact 54 is designed to coact with the contact 48. The contact 54 is connected by a wire 55 with the bus bar at one end of the frame 24. The bus bar at the other end of the same set of frames is connected by a wire 56 with the other wire 36 or 37.

It may be mentioned in this connection that in order to afford better electrical connections and prevent any shorts between the adjacent bus bars, the adjacent bus bars of two different toasting units are connected to the same lead wire 36 or 37 as the case may be.

Thus as shown in Figure 2, the right-hand bus bar of the left-hand toasting unit is connected through the switch to the wire 36, and the left-hand bus bar of the second toasting unit from the left is connected with the wire 36, whereas the left bus bar of the left-hand toasting unit is connected with the wire 37 and the right-hand bus bar of the second toasting unit from the left is connected through the switch with the wire 37, and the left-hand bus bar of the third toasting unit is connected with the wire 37 and so on.

Mounted on the wall 10 at the front end of each push rod 51 is a sleeve or tubular member 57. Mounted on the forward end of each push rod 51 is a tubular cap 58, which is telescopically slidable on the member 57. A coil spring 59 is mounted on the outer end of the push rod 51 and tends to force the rod 51 outwardly for holding the rod 51 in position where the contacts 54 and 48 are spaced from each other.

Adjacent to each opening 32 are brackets 60, which support rods 61 extending laterally in the device.

On each rod 61 is a slice supporting member 62, which in one position of its movement, as shown in the left-hand part of Figure 3 for instance, projects over the opening 32 and is adapted to support the slice of bread 29.

Fixed to each rod 61 is an arm 63. A link 64 is pivoted to each arm 63 and to the adjacent push rod 51, as shown for instance in Figures 2 and 3.

The parts just described are of such size, shape and connections that when the push rod is at the rearward limit of its movement with the contact members 54 and 48 in engagement, the members 62 will be held in supporting position, that is to say substantially horizontal, as illustrated in Figures 2, 3 and 4, whereas when the push rod 51 is moved forwardly by the action of the spring 59, the rods 61 will be rocked for tilting the supporting elements 62 downwardly for permitting the slices of bread 29 to drop through the openings 32 into the drawers 17.

For holding the push rod 51 at its rearward limit of movement against the tension of the spring 59 with the contact points 54 and 48 in engagement, I have provided the following means: On a bracket 64 adjacent to the push rod 51 is pivoted a pawl 65 adapted to coact with a notch 66 in the upper face of the push rod 51.

The pawl 65 has an upwardly extending curved arm 67, which is engaged by a spring 68 mounted on the bracket 64 for yieldingly pressing the pawl 65 against the push rod 51.

I have provided means actuated from the motor 33 for releasing the pawl 65 after the motor has operated a certain number of revolutions which would, of course, be for a predetermined length of time. Such a means has an adjustable element adapted to be varied for regulating the time which will elapse after the device has been set in operation, and before the pawl 65 is released.

Mounted in suitable brackets 69 is a transverse shaft 70. Supported by a bracket 71 is an inclined shaft 72 shown for instance in Figures 2 and 3.

On the shaft 72 is a gear device 73, which meshes with the gear device 35 on the motor shaft 34.

On the shaft 72 is a worm 74 arranged in mesh with a worm wheel 75 fixed on the shaft 70.

It will thus be seen that motion is imparted from the shaft 34 through the gear 73, the shaft 72, the worm 74 and the worm wheel 75 to the shaft 70.

On the shaft 70 is fixed a spur gear 76 for each toasting unit.

Mounted in the brackets 69 and parallel with the shaft 70 is a transverse shaft 77, which projects through one of the end walls 11, as shown in Figure 2, and has on its outer projecting end a dial 78.

On the shaft 77 adjacent to each arm 67 is a short sleeve 79 on one end of which is a cam 80 arranged to coact with the arm 67.

It is noted that the sleeve 79 is mounted to permit rotary movement of the sleeve on the shaft 77.

Rotatably mounted on the sleeve 79 is a spur gear 81 in mesh with the adjacent gear 76 on the shaft 70. Spaced from the spur gear 81 and fixed to the sleeve 79 by means of a key 82 or the like is a beveled gear 83.

Loosely received on the sleeve 79 adjacent to the gear 81 is a spring washer 84. A spacing sleeve 85 is mounted on the sleeve 79 between the beveled gear 83 and the spring washer 84 for holding the spring washer pressed against the gear 81.

It thus appears that rotation of the gear 76 will impart rotation to the gear 81 and the frictional engagement of the gear 81 with the washer 84, the sleeve 85 and the gear 83 impart rotation to the cam 80 and sleeve 79.

The parts are so arranged that when the motor is started, the cam 80 will engage the arm 67 of the trigger pawl 65 in a predetermined time thereafter depending upon the starting position of the cam 80.

Before starting the motor, the cam 80 may be adjusted to different positions for thus determining the length of time for the toasting operation by the following means: On the shaft 77 adjacent to the cam 80 is fixed a sleeve 86. Projecting from the sleeve 86 is a lug or the like 87 on which is pivoted a movable stop member 88, having a projecting arm 89, which is normally held in engagement with the stop arm 90 on the sleeve 86 by means of a spring 91.

The stop member 88 is so located that when the cam 80 is rotated on the shaft 77 counter clockwise from the position shown in Figure 3, the stop member will be engaged and pushed out of the way against the tension of the spring 91, whereas when the cam is rotated on the shaft in the opposite direction, it will be engaged and stopped by the member 88.

The shaft 77 and sleeve 86 thereon are adjustable rotatably.

Pivoted to the dial 78 is a dial latch 92, having a portion 93 projecting through an opening 94 in the dial and provided with a head 95. The dial latch 92 has a finger 96 adapted to be projected into anyone of a series of holes 97.

A spring 98 presses the dial latch finger 96 toward the wall 11 in which are the holes 97. The dial 78 may be provided with a knob 99.

It will be seen that by pressing inwardly on the head 94, the latch may be released and the shaft 77 rotated for adjusting the sleeve 86 and the stop member 88 to any desired position.

A shaft 100 for each toasting unit extends fore-and-aft in the machine and projects through the front wall 10 and has a head 101 on its forward end.

On the rearward end of the shaft 100 is a beveled gear 102, shown for instance in Figure 5, which meshes with the beveled gear 83 hereinbefore described.

Pivoted to a bracket 103 projecting downwardly from the deck 14 is a drawer locking device, having the form of a bell crank lever 104, one arm of which normally hangs in the upper part of the drawer 17 in position to be engaged by the rear wall of the drawer in case one should attempt to pull out the drawer.

Another arm of the bell crank locking device 104 projects upwardly through a slot 105 in the deck 14 to position adjacent to the forward edge of the insulating material bar 53, as shown in Figure 3. Thus when the push bar 51 is released and moves forwardly, it will operate the lock 104 to move its lower arm to position to permit the rear wall of the drawer to clear the locking device when the drawer is pulled out.

Mounted on a bracket 106 at the lower rear part of the lower compartment is a reel or drum 107 on which is wound a cable 108 secured to the rear wall of the drawer 17. A spring 109 tends to wind the cable on the drum, so that when the drawer is pulled out, the spring will be wound tighter and when the drawer is released, the spring will automatically wind the cable 108 on the drum 107, thus pulling the drawer back to its closed position.

I will now explain somewhat more fully the operation of my improved toaster and some of its advantages and will thereafter explain the modifications of my device illustrated in Figures 5 and 12.

The motor 33 is, of course, connected with the wires 36 and 37 and as soon as the external switch is closed, the motor runs. In preparing for the operation of the machine, the shaft 77 is adjusted for setting the stop 88 in proper position by the manipulation of the dial 78. Shafts 100 are rotated for rotating the gears 102 and 83 for turning the cams 80 clockwise or backward (assuming them to be in the positions as shown in Figure 3) until the cams engage the stops 88. The slices of bread 29 are then dropped through the slots 21, depressing the closure device 23 until they drop downwardly upon the slice supporting members 62.

Current is supplied to the heating units in the manner heretofore described, and as soon as the external switch is turned on, the motor begins to operate.

Being geared down, the motor turns the gears 81 and the cams 80 very slowly. At the proper time, the cams 80 engage the arms 67, thus drawing the pawls 65 out of the notch 66. Thereupon the push bars 51 are actuated by the springs 59 with a forward movement, which through the links 64 actuates the arms 63 and rocks the shafts 61 for tilting the slice supporting members 62 downwardly and permitting the toasted bread to drop into the drawers 17.

The forward movement of the push bars 51 moves the locking device 104 to inoperative position, so that the drawer may be pulled out for removing the toast.

It will be noted that the movement of the push rods disconnects the contact members 54 and 48 and shuts off the current through the heating elements.

When the operator desires, he may push the rods 51 rearwardly, whereupon the spring 68 will cause the pawl 65 to enter the notch 66 and the current will again be closed through the heating element.

The operator may then drop in fresh slices of bread and he should immediately thereafter rotate the appropriate shaft 100 for turning the cam 80 back to engagement with the stop 88, whereupon the motor will again slowly rotate the cam until the cam again engages the arm 67.

On account of the bread varying somewhat, it may be desired to change the predetermined toasting period, and this is accomplished in the manner hereinbefore described by rotating the shaft 77.

In Figure 5, I have shown a slightly modified form of the switch in which a resilient or spring pressure is secured.

In the form of the switch shown in Figure 5, I have illustrated the pair of contact points 110 mounted on an insulating bracket and connected respectively with the wire 50 leading to one of the main current conducting wires and the wire 55 leading to one of the bus bars.

On the plate 53 of insulating material is an upwardly extending plate 112.

Mounted on the plate 112 are two spring bars 113. The spring bars 113 are separated by spacer blocks 114 and carry the contact points 115 for coacting with the points 110. The points 115 are connected by the wire 116.

In Figure 12, I have shown a device for operating the switches, which may be used instead of the push rod 51 and its connected parts. A switch like the switch shown in Figure 5 is employed, except that for the member 53, there is substituted a bar 117 slidably mounted in the bracket 118 and connected with a lever 119 extended through a hole 120 in the deck 14 and pivoted between its ends at 121 on one of the ribs 15.

On the rear wall of the drawer 17 is mounted a plate 122 extending forwardly and having an upwardly extending flange 123, as shown. The lower end of the lever 119 is held by springs 124 and 125 normally in substantially upright position. Then when the drawer is closed, the lower end of the lever 119 stands between the flange 123 and the rear wall of the drawer.

When the drawer is pulled forward to pull it out, the rear wall engages the lever 119 and operates the switch for opening it.

After the rear wall clears the lever, the lever is pulled back by the springs to substantially vertical position. When the drawer is closed, the flange 123 engages the lever 119 for closing the switch.

The spring members 113 permit the lever 119 to clear the rear wall and engage the flange 123, which holds the lever 119 in position for holding the switch closed.

It will thus be seen that when the device shown in Figure 12 is employed, the opening of the drawer will automatically break the current.

Some changes may be made in the arrangement and construction of the various parts of my device, without departing from the essential features and purposes of my invention and it is my intention to cover by my claims, any modified forms of structure or use of mechanical equivalents, which may be reasonably included within their scope.

I claim as my invention:

1. In a device of the class described, a casing having a compartment for toasting bread or the like, means for heating said compartment, a storage compartment below said first compartment, a movable supporting element between said compartments, and means for automatically moving said supporting element to inoperative position.

2. In a device of the class described, a casing having a compartment for toasting bread or the like, means for heating said compartment, a storage compartment below said first compartment, a movable supporting element between said compartments, and means for automatically moving said supporting element to inoperative position after a predetermined length of time.

3. In a device of the class described, a compartment for toasting bread or the like, a heating means therein, a storage compartment below said first compartment, a movable supporting element between said compartments, and means for automatically rendering said heating element and said movable supporting element inoperative after a predetermined length of time.

4. In a device of the class described, a compartment for toasting bread or the like, a heating means therein, a storage compartment below said first compartment, a movable supporting element between said compartments, and means for automatically rendering said heating element and said movable supporting element inoperative after a predetermined length of time, said last means being adjustable for varying the time of its operation.

5. In a device of the class described, a toasting compartment, an electric heating element therein, a storage compartment below said first compartment, a drawer slidably mounted in the storage compartment, and a movable supporting element between said compartments.

6. In a device of the class described, a toasting compartment, an electric heating element therein, a storage compartment below said first compartment, a drawer slidably mounted in the storage compartment, a movable supporting element between said compartments, means for connecting said heating element with a source of electrical energy, including a switch, and means for automatically operating said supporting element for dropping bread or the like supported thereon from the toasting compartment to the storage compartment after the current has been on for a predetermined length of time.

7. In a device of the class described, a toasting compartment, an electric heating element therein, a storage compartment below said first compartment, a drawer slidably mounted in the storage compartment, a movable supporting element between said compartments, means for connecting said heating element with a source of electrical energy, including a switch, and means for automatically operating said supporting element for dropping bread or the like supported thereon from the toasting compartment to the storage compartment after the current has been on for a predetermined length of time, and means for automatically shutting off said current when the drawer is removed.

8. In a device of the class described, a toasting compartment, a storage compartment adjacent to said toasting compartment, a drawer in said storage compartment, an electrical heating unit in said toasting compartment, means for connecting said unit with a source of electrical energy, and means for shutting off the current when said drawer is opened.

9. In a toaster, a toasting compartment, a storage compartment below said toasting compartment, a heating means for said toasting compartment, a movable supporting element between said compartments, and means for moving said element to inoperative position when the toasting operation is completed for permitting the toasted bread or the like to drop into said storage compartment, so that it may be kept warm until used, and means for moving the supporting element to operative position when the heating means is made operative.

10. In a toaster of the class described, a toasting compartment, a storage compartment therebelow to receive toast dropped therefrom, an electrical heating unit in said toasting compartment, a drawer slidably mounted in said storage compartment, means for connecting said unit with a source of electrical energy, and means for locking the drawer, adapted to be rendered inoperative when the electrical current is shut off.

11. In a toasting device of the class described, a toasting compartment, a storage compartment therebelow to receive toast dropped therefrom adapted to receive toasted bread or the like from the toasting compartment for keeping the bread warm, a drawer in said storage compartment slidably mounted, and means tending to yieldingly hold said drawer in closed position.

12. In a toasting device of the class described, a toasting compartment, a storage compartment therebelow to receive toast dropped therefrom, a drawer in said storage compartment slidably mounted, and means for automatically closing the drawer after it has been moved to open position.

13. In a device of the class described, a casing having a compartment for toasting bread or the like, means for heating said compartment, a storage compartment below said first compartment, a movable supporting element between said compartments, and means for automatically moving said supporting element to inoperative position after a predetermined length of time, said means being adjustable for varying the time of its operation.

14. In a device of the class described, a toasting compartment, a pair of heating units therein, an electric circuit including a switch and said heating units, a push rod operatively connected with one member of the switch, means tending to yieldingly move said push rod to position for opening the switch, a spring-actuated pawl for holding the push rod in position with the switch closed.

15. In a device of the class described, a toasting compartment, a pair of heating units therein, an electric circuit including a switch and said heating units, a push rod operatively connected with one member of the switch, means tending to yieldingly move said push rod to position for opening the switch, a spring-actuated pawl for holding the push rod in position with the switch closed, and a mechanism for releasing said pawl.

16. In a device of the class described, a toasting compartment, a pair of heating units therein, an electric circuit including a switch and said heating units, a push rod operatively connected with one member of the switch, means tending to yieldingly move said push rod to position for opening the switch, a spring-actuated pawl for holding the push rod in position with the switch closed, and a mechanism for releasing said pawl after a predetermined length of time.

17. In a device of the class described, a toasting compartment, a pair of heating units therein, an electric circuit including a switch and said heating units, a push rod operatively connected with one member of the switch, means tending to yieldingly move said push rod to position for opening the switch, a spring-actuated pawl for holding the push rod in position with the switch closed, and a mechanism for releasing said pawl after a predetermined length of time, said mechanism including an adjustable element for varying the action of said mechanism.

18. In a device of the class described, a toasting compartment, a pair of heating units therein, an electric circuit including a switch and said heating units, a push rod operatively connected with one member of the switch, means tending to yieldingly move said push rod to position for opening the switch, a spring-actuated pawl for coacting with said push rod for holding it in position with the switch closed, yielding means tending to normally move the push rod to position with the switch open, and a movable supporting element operatively connected with said push rod.

19. In a device of the class described, a toasting compartment, a pair of heating units therein, an electric circuit including a switch and said heating units, a push rod operatively connected with one member of the switch, means tending to yieldingly move said push rod to position for opening the switch, a spring-actuated pawl for coacting with said push rod for holding it in position with the switch closed, yielding means tending to normally move the push rod to position with the switch open, a shaft, means for locking said shaft in different positions of its movement, a spring-actuated stop device on said shaft, a cam loosely mounted on said shaft for coacting with said pawl, a source of power, and means for operatively connecting said source of power with said pawl, said means including a friction device.

20. In a device of the class described, a toasting compartment, a pair of heating units therein, an electric circuit including a switch and said heating units, a push rod operatively connected with one member of the switch, means tending to yieldingly move said push rod to position for opening the switch, a spring-actuated pawl for coacting with said push rod for holding it in position with the switch closed, yielding means tending to normally move the push rod to position with the switch open, a movable supporting element operatively connected with said push rod, a swinging locking device adapted to be moved to inoperative position by the movement of said push rod in one direction, a receiving compartment, and a drawer therein adapted to coact with said locking device.

Des Moines, Iowa, May 8, 1923.

SAM CHRISTY.